Jan. 21, 1969 D. I. WELT 3,423,056
CAMERA LOCK FOR CONNECTING A CAMERA TO TRIPOD
Filed Oct. 11, 1966

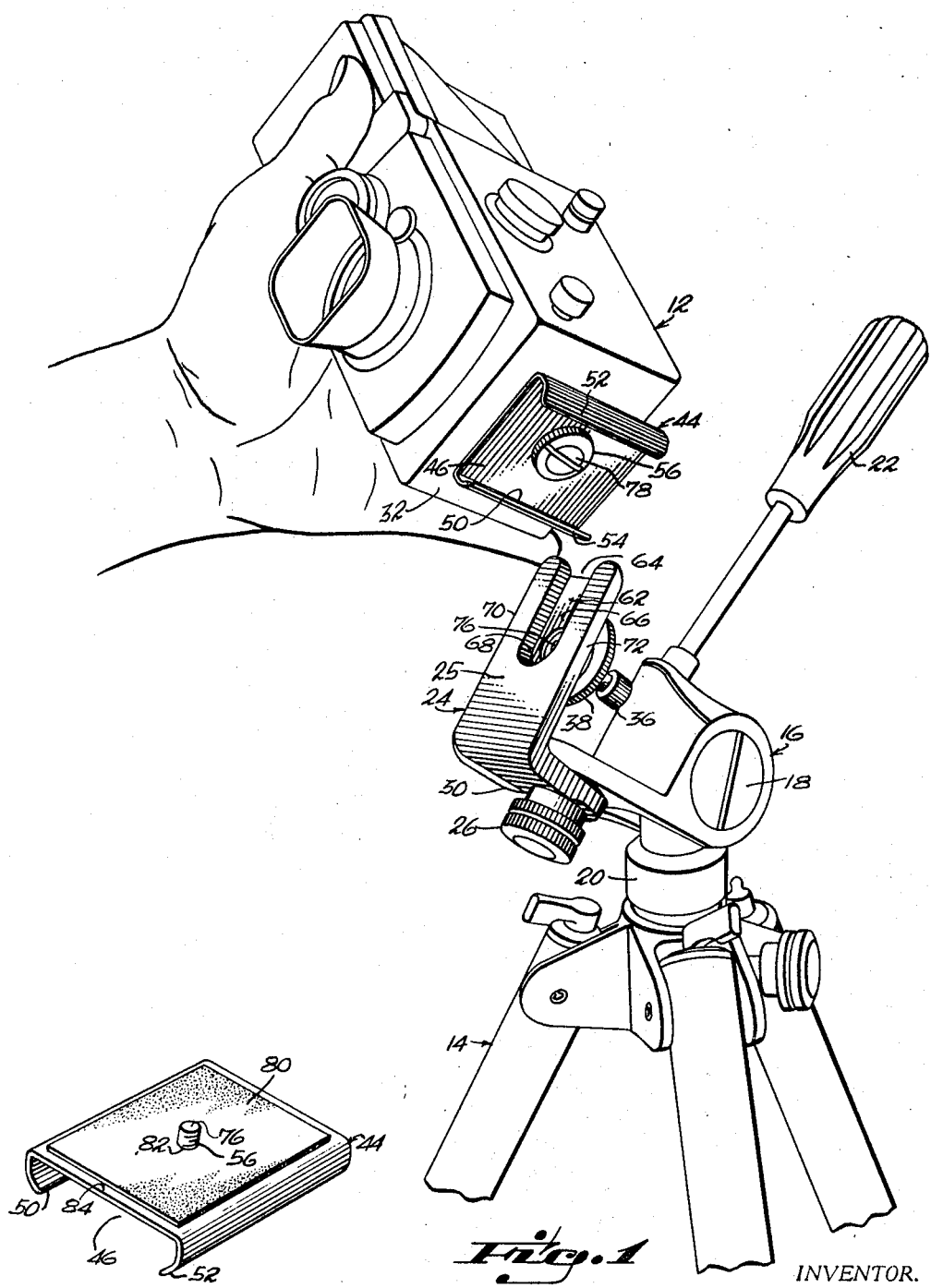

INVENTOR.
DAVID I. WELT
BY John Cyril Malloy
ATTORNEY.

Jan. 21, 1969   D. I. WELT   3,423,056
CAMERA LOCK FOR CONNECTING A CAMERA TO TRIPOD
Filed Oct. 11, 1966   Sheet 3 of 3

INVENTOR.
DAVID I. WELT
BY
John Cyril Malloy
ATTORNEY.

United States Patent Office 3,423,056
Patented Jan. 21, 1969

3,423,056
CAMERA LOCK FOR CONNECTING A
CAMERA TO TRIPOD
David I. Welt, 7480 SW. 128th St.,
Miami, Fla. 33143
Filed Oct. 11, 1966, Ser. No. 585,835
U.S. Cl. 248—187
Int. Cl. F16m 11/04, 11/10
5 Claims

ABSTRACT OF THE DISCLOSURE

A coupling assembly for detachably mounting and orienting a camera having a threaded aperture in one surface on a tripod support platform or the like in which an adapter element is detachably mounted by a separate fastener on the camera at the threaded aperture and includes an orienting portion complementary to a portion of a recessed slot in the surface of a support platform, and in which the platform has journaled below the platform a manually operable, captive nut having an abutment screw disposed normal to the recessed slot and abuttingly engageable with the orienting portion of the adapter element for detachably retaining the adapter element and camera to which it is attached in a fixed position relative to the support platform.

---

This invention relates to a camera lock for connecting a camera having a screw hole to a tripod, and, more particularly, to an improved adapter for connection to a camera which is sized to interengage a base member of improved construction for mounting on a camera tripod.

An important object of this invention is to provide a camera lock adapted for utilization in affixing a camera to a tripod which includes means to automatically position the camera on a tripod and quickly lock the camera to hold it in a position without danger of slipping and irrespective of the range of movement of the camera, i.e., about a vertical axis, about a horizontal tilt axis, or about a second horizontal axis of panning or yaw.

It is another object of this invention to provide an improved base member adapted to be connected to the mounting standard of a tripod camera which includes a platform to support a camera, and keeper means movable relative to the platform to engage a lock member, adapter or a camera, and screw means to connect the base member to a camera tripod standard in a pivotal connection adjustable through a range of rotation about an axis in a horizontal plane perpendicular to the vertical axis when the platform supports the camera in a horizontal attitude.

It is another object of this invention to provide a base member of the type described in the foregoing paragraph sized to interengage with a lock member carried by a camera and keeper means interengage the adapter, the said base member being configured to interengage either of two type camera adapters.

It is another object of this invention to provide a camera lock including a lock member and a base member with the lock member including a body having a through hole and with the body defining a hollow therein and carrying a headed screw with the shank extending into the standard threaded recess of a camera to connect the lock member to the camera; and the base member including a platform, screw means to connect the base member to a camera tripod and keeper means operable for movement relative to the platform between a first position to lock the member to the base member and a second position to release the lock member with the said platform being configured to interengage the lock member to position the same relative to the base member and keeper means to penetrate into the hollow to frictionally interengage the members.

It is another object of this invention to provide a camera lock as set forth in the preceding paragraph wherein the lock member includes opposing flanged portions bent out of the main plane of a body to define a guide track and the sides of the base member on either side of a position guide slot are configured to mate with the lock member in nested relation between the flanges.

It is another object of this invention to provide a camera lock as set forth in the preceding paragraph wherein the lock member includes a cushion intermediate the camera and the body of the lock member.

It is another object of this invention to provide an adapter for a camera comprising a lock member to interengage in a slot of a base member and including mutually interengaging positioning means and means to lock the members together.

It is another object of this invention to provide a camera lock which is capable of quick and easy attachment and detachment from a camera tripod and which includes an adapter rigidly connected to the camera which will removably attach in a quick connecting operation to a mating base member on a tripod camera which adapter is simple in construction and inexpensive to manufacture and is otherwise well adapted for the purposes which will be apparent on reading of the following application.

In accordance with these and other objects which will become apparent hereinafter, the instant invention will now be described with reference to the accompanying drawings in which:

FIGURE 1 is a perspective view with parts broken away showing a tripod and camera to be mounted thereon utilizing the instant camera lock;

FIGURE 2 is a perspective view of the adapter or lock member for the camera as shown in FIGURE 1 and illustrating a first preferred embodiment;

Figure 3:
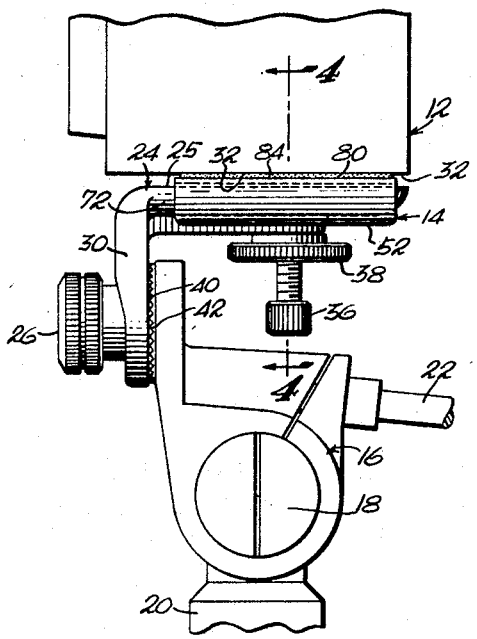
FIGURE 3 is a side view with the tripod broken away and showing the camera lock of FIGURE 2 affixed to a tripod.

Referring to the drawings, wherein like reference characters designate like or corresponding parts throughout the different views, it will be seen on reference to FIGURE 1 that the camera 12 is to be mounted to a tripod 14 having a pivotable mounting standard 16 for rotation about a horizontal axis, such as that of the screw 18, and a vertical axis, such as that of the staff 20 by means of the operator handle 22. The camera lock of each embodiment includes a base member 24 to be described more fully hereinafter and screw means or adjustment means 26 on the depending portion 30 thereof to engage the standard 16 and permit of adjustment of the base member with respect to a third axis perpendicular to the plane of the aforesaid axes.

Figure 4:
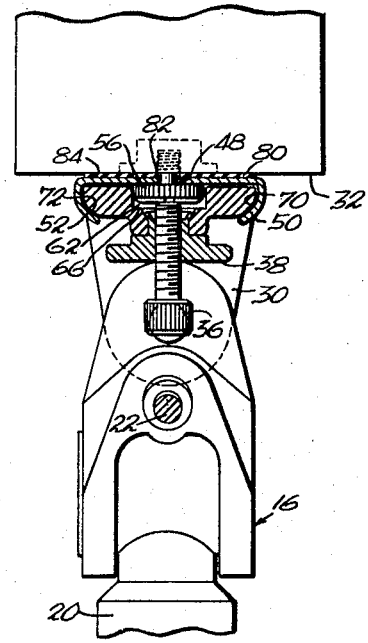
FIGURE 4 is a right side view partly in cross section taken along the plane indicated by the line 4—4 of FIGURE 3 and looking in the direction of the arrows.
Figure 5:
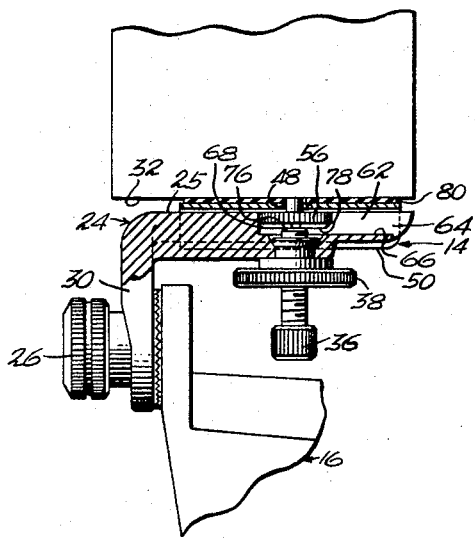
FIGURE 5 is a view similar to that of FIGURE 3 with the camera lock being partly broken away and the parts illustrated in cross section.
Figure 6:
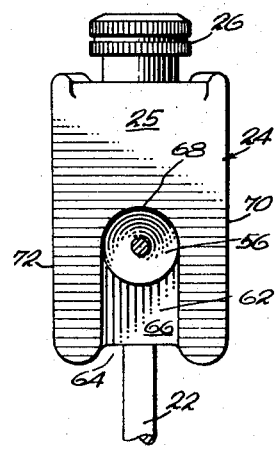
FIGURE 6 is a top view of that portion of the base member of the camera lock which remains adjustably affixed to the tripod.
Figure 11:
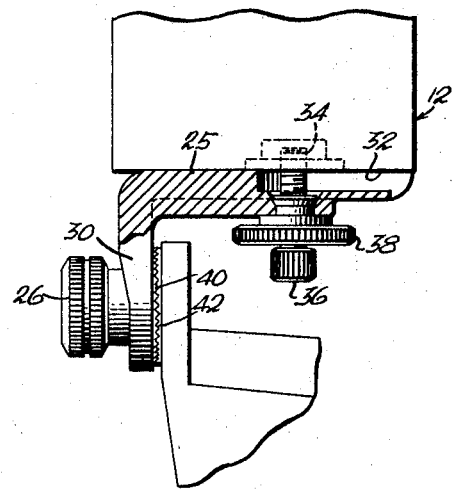
FIGURE 11 is a side view similar to FIGURE 8 and illustrating the base member of the camera lock attached to a camera.
Figure 10:
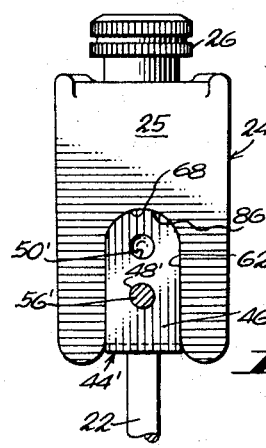
FIGURE 10 is a top view similar to that of FIGURE 6 and illustrating the camera having the adapter of the second preferred embodiment mounted thereto.

Turning briefly to FIGURE 11, it will be seen that the camera 12 is provided in one surface 32 thereof, as is standard practice, with a threaded recess 34. Through the platform portion 25 of the base member a screw 36 is carried to extend on threaded travel thereof into and out of threaded engagement in the recess 34 to be locked in position by the lock means 38. As seen in FIGS. 3–5, the lock means 38 is in a sense a captive nut journaled on the platform 24 and through which screw 36 is threaded. Rotation of nut 38, which is of relatively large diameter, will move the screw 36 relative to the platform 24, when the screw 36 is held against rotation. The depending portion 30 of the base member is provided with a through hole to accommodate passage of the means 26 having uniformly spaced teeth 40 confronting mating teeth 42 on the standard 16. Thus, in the embodiment of FIGURE 11 the camera may be rotated with respect to an axis perpendicular to the first and second axes or those axes which lie in a common plane when the platform is in horizontal attitude on a tripod.

Figure 7:
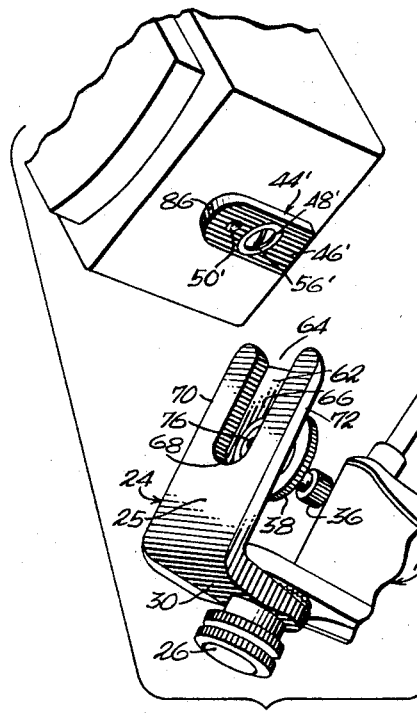
FIGURE 7 is a partial perspective view with parts broken away of a second and alternative preferred embodiment of the camera lock.
Figure 8:
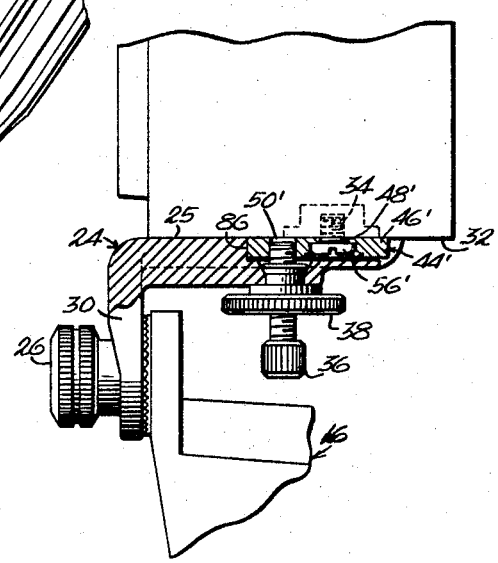
FIGURE 8 is a side view partly in cross section of the camera lock of FIGURE 7.
Figure 9:
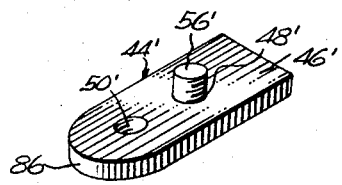
FIGURE 9 is a perspective view of the adapter of the alternative embodiment.

Turning now to the first and second preferred embodiments which may be seen in FIGURES 1 and 7 respectively, it will be seen that the adapter or lock member 44 and 44' of each embodiment includes a body 46 and 46' having a through hole 48 and 48' with the body defining a hollow portion; in the case of the embodiment of FIGURE 1, the hollow being designated by the numeral 50 and lying between the main plane of the body and depending flanges 52 and 54 which are bent out of the main plane and with the distal or terminal edges confronting one another and tracing arcuate paths as seen in an end view; and in the case of the embodiment of FIGURE 7, the hollow being designated by the numeral 50' and consisting of a screw hole. Further, each of the adapters includes a headed screw 56 and 56' with the shank extending through the hole of the body to threadably connect in the standard camera recess 34 to hold the member on the camera surface 32 which has the hole. In the following paragraphs the base member will be described in detail following which the adapter of FIGURE 1 and the adapter of FIGURE 7 will be described in relation to employment of the same for hooked-up connection of an adapter bearing camera with the base member.

Turning now to the base member 24, it will be seen that it includes the aforesaid platform portion 25 which is provided with an elongate slot or recess 62 having an open mouth 64 and floor 66 which extends from the open mouth to a terminal wall 68 which, in the embodiment shown, is semi-circular as seen in plan. Also, the opposing side edges 70 and 72 parallel to the centerline of the slot are curved or arcuate as can be seen in cross section in FIGURE 4, the radius of curvature being uniform.

With respect to the embodiment shown in FIGURE 1, the platform is adapted for sliding penetration in the hollow 50 of body 46 with the flanges 50 and 52 being sized to snugly embrace the sides 70 and 72 and permit of sliding movement of the camera bearing adapter until the positioning means comprising the headed screw 56 interengages the curved terminal end of the slot, it being noted that the diameter of the screw 56 is sized to mate with the terminal end and limit movement. Thereafter, threaded tightening of the screw or keeper means 36 will cause the distal end 76 of the screw to bear against the face 78 of the screw means 56 so that the curved flanges and the sides 70 and 72 will tightly grip and hold the camera in position on the base member which in turn is connected to the tripod. In the preferred embodiment a felt overlay or protective cushioning pad 80 having a hole 82 may be provided for the camera confronting face 84 of the body of the adapter.

Turning now to the adapter of FIGURE 7, the nose or leading edge 86 is of a similar diameter to that of the terminal end of the slot and comprises the positioning means for the camera on the platform and it will be noted that when the nose 86 engages the wall at the terminal end of the slot, the hollow 50' is positioned in axial alignment with the screw 36 of the keeper means on the base member so that the lock member or adapter may be threadably engaged by threaded travel of the screw 36 into threaded engagement with the interior threaded walls of the hollow of this embodiment.

While the instant invention has been shown and described herein in what are conceived to be the most practical and preferred embodiments, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. An assembly of removably mounting and orienting a camera having a threaded aperture on a tripod head comprising in combination.
    a base member having an elongated recess in a support surface, said recess opening into one edge of said base member,
    manually operable, threaded abutment screw means mounted on said base member on an axis of rotation normal to said support surface and having an abutment portion adjustably positionable intermediately of said recess for relative movement into and out of said recess; and
    an adapter element comprising a plate-like element including a separate threaded fastener extending transversely therethrough for engagement in the threaded aperture of the camera, said base member including opposed side edges, said separately threaded fastener larged head being disposed over the abutment portion of said recess, said adapter element including inwardly directed side flanges slidably engageable over the side edges of said base member, said enlarged head being disposed over the abutment portion of said manually operable threaded abutment screw means for engagement thereby when disposed in oriented relation in said recess of said support surface.

2. The structure as claimed in claim 1 in which said screw means comprises a captive nut journaled for rotation beneath said base member, said abutment portion comprising a separate screw threadedly engaged in said captive nut for movement normal thereto as said captive nut is rotated.

3. The structure as claimed in claim 1 in which said base member comprising an element of a tripod head and includes a portion depending from one side thereof and having a transverse aperture having a plurality of teeth in the surface surrounding said aperture, said tripod head including a portion having a transverse, threaded aperture surrounded by grooves complementary to said teeth and in opposed relation thereto, and a screw element extending through the aperture of said base member depending portion and upon which the same is journaled for rotation, said screw element being engaged in the threaded aperture surrounded by grooves whereby said base member can be adjustably and fixedly positioned in angular relation about an axis defined by said screw element.

4. The structure as claimed in claim 3 in which said screw means comprises a captive nut journaled for rotation beneath said base member, said abutment portion comprising a separate screw threadedly engaged in said captive nut for movement normal thereto as said captive nut is rotated.

5. The structure as claimed in claim 1 in which said enlarged head is cylindrical, said recess having an arcuate terminal wall with which a portion of the cylindrical head is complementary.

References Cited

UNITED STATES PATENTS

| | | | |
|---|---|---|---|
| 1,629,579 | 5/1927 | Langley | 248—187 |
| 2,514,313 | 7/1950 | Davidson et al. | 248—183 |
| 2,536,170 | 1/1951 | Guest | 248—177 |
| 2,615,664 | 10/1952 | Reeves | 248—177 |
| 2,717,138 | 9/1955 | Sheehan | 248—183 |
| 2,765,138 | 10/1956 | Nelson | 248—291 XR |
| 2,897,928 | 8/1959 | Selig | 248—224 XR |

ROY D. FRAZIER, *Primary Examiner.*

ROBERT P. SEITTER, *Assistant Examiner.*

U.S. Cl. X.R.

248—185